March 3, 1970  D. W. HAWK  3,498,639
VEHICLE TILT LIMIT STOP
Filed Dec. 14, 1967
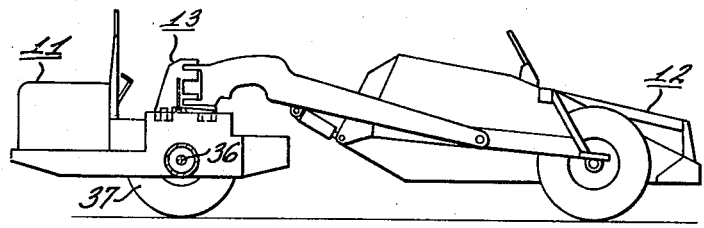
Fig. 1
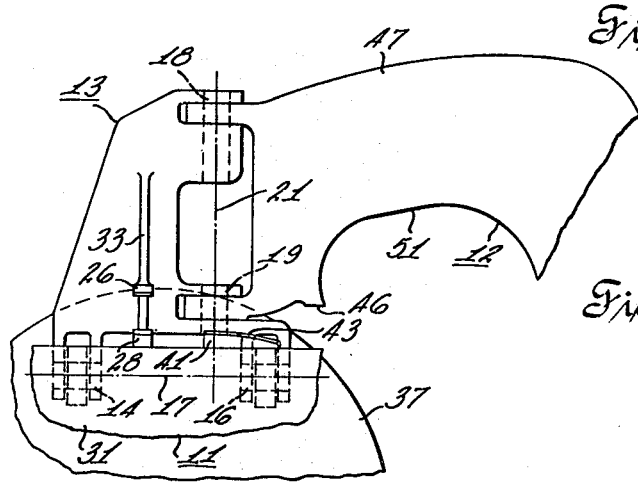
Fig. 2
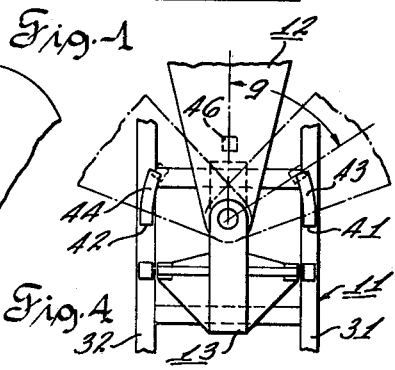
Fig. 4
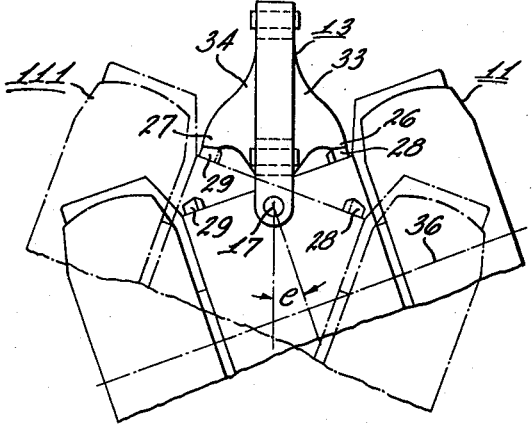
Fig. 3
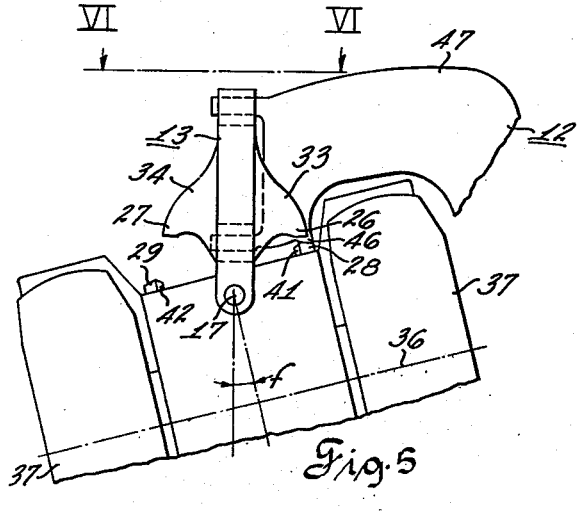
Fig. 6
Fig. 5
Inventor
Dale W. Hawk
By Charles L. Schwab
Attorney

United States Patent Office 3,498,639
Patented Mar. 3, 1970

3,498,639
VEHICLE TILT LIMIT STOP
Dale W. Hawk, Springfield, Ill., assignor to Allis-Chalmers Manufacturing Company, Milwaukee, Wis.
Filed Dec. 14, 1967, Ser. No. 690,666
Int. Cl. B62d 53/04
U.S. Cl. 280—492                                       2 Claims

ABSTRACT OF THE DISCLOSURE

Tilt limit means are provided in an articulated vehicle to limit relative pivotal movement between the tractor unit and hitch member about their longitudinal hitch axis. Less tilting movement of the tractor unit is permitted during short radius turning than in its straight ahead position.

---

This invention relates to an articulated vehicle having new and improved means for limiting pivotal movement of the tractor unit thereof about its longitudinal hitch axis.

Heretofore, it has been a common practice to provide abutment means on the intermediate hitch member of an articulated vehicle, such as a motor scraper, to limit the tilt or oscillation of the tractor unit relative to the hitch member. It has been found desirable to limit the pivotal movement to a greater extent in the short radius turn positions of the tractor unit than in the straight ahead driving position. It is, therefore, an object of this invention to provide less relative pivotal movement between tractor unit and intermediate hitch member in short radius turn positions than in the straight ahead position of the tractor unit.

It is a further object of this invention to provide a gradual decrease of permissible pivoting between the tractor unit and hitch member as the tractor unit approaches short radius turn positions.

It is a further object of this invention to provide a first set of cooperating stops on the hitch member and tractor unit which limit pivotal movement between the tractor unit and hitch member to a fixed degree in straight ahead and long radius turn positions of the tractor unit and an independent set of abutments on the trailer and tractor units which cooperate to further limit tilting movement of the tractor unit in short radius turn positions.

These and other objects and advantages of this invention will be apparent to those familiar with the art to which this invention relates when the following description is read in conjunction with the drawings in which:

FIG. 1 is a side view of an articulated vehicle in which the present invention is incorporated;

FIG. 2 is an enlarged view of the hitch construction of the vehicle shown in FIG. 1;

FIG. 3 is a front view of the hitch shown in FIG. 2;

FIG. 4 is a view taken along the line IV—IV in FIG. 3;

FIG. 5 is a front view of the hitch shown in FIG. 2 with the tractor in a short radius turn position; and FIG. 6 is a view taken along the line VI—VI in FIG. 5.

Referring to FIGS. 1 and 2 of the drawings, the present invention is incorporated in an articulated vehicle in the form of a motor scraper having a two wheel tractor unit 11 and a two wheel trailer unit 12. These tractor and trailer units are interconnected by an intermediate hitch member 13 to permit steering and tilting movement therebetween. The tractor unit 11 is pivotally connected to the hitch member 13 by a pair of aligned pins 14, 16 for pivotal or tilting movement about a longitudinal axis 17. The trailer unit 12 is pivotally connected by a pair of aligned pins 18, 19 for pivotal steering movement about an upstanding pivot axis 21. As shown in FIGS. 1, 2, 3 and 4, the tractor unit is in a straight ahead position relative to the trailer unit 12.

As is common in motor scraper design, the tractor unit 11 may be steered 90 degrees to either side of the straight ahead position, one such 90 degree steer position being illustrated in FIGS. 5 and 6. In the straight ahead driving position, relative pivotal movement between the tractor unit 11 and the hitch member 13 about the longitudinal pivot axis 17 is limited entirely by pairs of cooperating stops 26, 27 and 28, 29 provided, respectively, on frame members 31, 32 of the tractor unit 11 and laterally disposed arms 33, 34 of the hitch member 13. These stops 26, 27, 28, 29 limit tilting movement of the tractor unit to 20 degrees from its normal position, that is, a position in which the upstanding pivot axis 21 is vertical and the axis 36 of the two drive wheels 37 lies in a horizontal plane. This 20 degrees of pivotal movement is represented by the angle e as illustrated in FIG. 3. In FIG. 3 the extreme tilt positions of the tractor unit about the longitudinal axis 17 are shown in solid lines in one direction and in broken lines 111 in the other direction. As shown in FIG. 3, stop 26 is in abutment with stop 28 at the 20 degree tractor unit tilt limit.

As shown particularly in FIGS. 2 and 4, a pair of abutments 41, 42 are provided on frame members 31, 32 of the tractor unit 11 which have upward sloping surfaces 43, 44, respectively. When the tractor unit 11 is turned 90 degrees relative to the trailer unit 12, as shown in FIGS. 5 and 6, the cooperating abutment 46 on the draft frame 47 of the trailer unit will cooperate with abutment 41 thereby limiting relative pivotal movement of the tractor unit toward the hitch member 13 and trailer unit to an angle f of 14 degrees. The upward facing surfaces 43, 44 of abutments 41, 42 slope upwardly from rear to front and are in confronting relation to abutment 46 on the trailer units as the steer angle g exceeds 57 degrees.

The degree of permissible tilting movement permitted by cooperation between abutment 46 and abutments 41, 42 varies from approximately 20 degrees when the angle g is 57 degrees to 14 degrees at an extreme short turn radius position in which angle g is 90 degrees.

It should be understood that tilting movement of the tractor unit 11 away from the trailer draft frame 47 will not be affected by abutment 46 but rather will be controlled by one of the cooperating pairs of abutments 26, 27, 28, 29. Thus, in any turning position the tractor unit will always be permitted to tilt 20 degrees in the direction away from the draft frame 47.

The present invention permits a relatively low silhouette draft frame 47 since its bottom 51 can be lower than if a full 20 degree tilt were permitted in the sharp turn positions. The abutments 41, 42 and 46 act as secondary tilt stops which override the primary stops 26, 27, 28, 29 during tractor unit turns of more than 57 degrees from a straight ahead driving position.

In some instances, it may be desirable to use larger tires on the tractor unit of an articulated vehicle. In that event the secondary tilt limit stops of this invention can be added to prevent interference between the tires, or the enlarged fenders therefor, and the draft frame, which interference might otherwise occur if the full tilting permitted by the primary tilt stops were allowed.

The embodiments of the invention in which an exclusive property or privilege is claimed are defined as follows:

1. In an articulated vehicle having a tractor unit with a pair of drive wheels and pivotally connected to an intermediate hitch member on longitudinal axis and a trailer unit with a draft frame pivotally connected to the hitch member for swinging movement about an upstanding pivot axis between straight ahead and opposite short radius turn position in which said drive wheels are directly beneath the draft frame, the improvement comprising: cooperating stops on said hitch member and tractor unit limiting pivotal movement of said hitch member relative to said tractor unit in opposite directions about said longitudinal axis in all positions of said trailer unit, and cooperating abutments rigidly fixed on said tractor and trailer units, respectively, permitting less relative pivotal movement between said hitch member and tractor unit in said short radius turn positions of said tractor unit than in said straight ahead position whereby said drive wheels are prevented from swinging upwardly against said draft frame, said abutments including a pair of upward sloping ramp surfaces on one of said units whereby the permissible relative pivotal movement between the tractor unit and hitch member is gradually decreased as said tractor unit pivots about said upstanding axis toward said short turn radius positions.

2. The invention of claim 1 wherein said pair of upward sloping abutments are on said tractor unit.

References Cited

UNITED STATES PATENTS

| | | | |
|---|---|---|---|
| 1,853,701 | 4/1932 | Schlaegel | 280—438 |
| 1,990,731 | 2/1935 | Greer | 280—423 |
| 2,311,941 | 2/1943 | Gustafson | 280—423 |
| 2,400,522 | 5/1946 | Lanz | 280—492 |
| 2,720,417 | 10/1955 | Kling | 298—18 |
| 3,049,365 | 8/1962 | Kirchler | 280—492 X |
| 3,360,281 | 12/1967 | Allen | 280—423 |
| 3,443,826 | 5/1969 | Hermiz | 280—492 |

LEO FRIAGLIA, Primary Examiner

U.S. Cl. X.R.

37—129; 280—432